United States Patent
Cai et al.

(10) Patent No.: US 10,749,608 B2
(45) Date of Patent: Aug. 18, 2020

(54) SIGNAL RECEIVING APPARATUS AND METHOD

(71) Applicant: HUAWEI TECHNOLOGIES CO., LTD., Shenzhen, Guangdong (CN)

(72) Inventors: Yongjing Cai, Zürich (CH); Liangliang Lu, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/592,128

(22) Filed: Oct. 3, 2019

(65) Prior Publication Data

US 2020/0044750 A1    Feb. 6, 2020

Related U.S. Application Data

(63) Continuation of application No. PCT/CN2018/082259, filed on Apr. 9, 2018.

(30) Foreign Application Priority Data

Apr. 24, 2017   (CN) .......................... 2017 1 0271787

(51) Int. Cl.
*H04B 10/70* (2013.01)
*H01S 5/062* (2006.01)
(Continued)

(52) U.S. Cl.
CPC ......... *H04B 10/70* (2013.01); *H01S 5/06216* (2013.01); *H04B 10/508* (2013.01); *H04B 10/85* (2013.01); *H04L 9/0852* (2013.01)

(58) Field of Classification Search
CPC ...... H04B 10/70; H04B 10/508; H04B 10/85; H01S 5/06216; H04L 9/0852
See application file for complete search history.

(56) References Cited

U.S. PATENT DOCUMENTS 9,077,577 B1 * 7/2015 Ashrafi ................ H04B 10/532
9,553,677 B1   1/2017 Soh et al.
(Continued)

FOREIGN PATENT DOCUMENTS

CN   101176298 A   5/2008
CN   102916807 A   2/2013
(Continued)

OTHER PUBLICATIONS

Bing Qi et al.:"Generating the Local Oscillator "Locally" in Continuous-Variable Quantum Key Distribution Based on Coherent Detection", Physical Review X 5, 041009 (2015). pp. 041009-1-041009-12.
(Continued)

*Primary Examiner* — Mina M Shalaby
(74) *Attorney, Agent, or Firm* — Westerman, Hattori, Daniels & Adrian, LLP

(57) ABSTRACT

Embodiments of this application relate to a signal receiving apparatus and method. The receiving apparatus includes: a signal receiving module, configured to detect a reference pulse signal in a received optical pulse signal where the optical pulse signal is the reference pulse signal and a quantum optical pulse signal; and a synchronization clock module, configured to obtain a modulation pulse signal based on the reference pulse signal. A first intensity modulator in the signal receiving module is configured to obtain, based on the modulation pulse signal, a first local-frequency optical pulse signal having same timing as the optical pulse signal, and the signal receiving module uses the first local-frequency optical pulse signal to interfere with the reference pulse signal and the quantum optical pulse signal separately to obtain a raw key.

20 Claims, 8 Drawing Sheets

(51) Int. Cl.
*H04B 10/508* (2013.01)
*H04B 10/85* (2013.01)
*H04L 9/08* (2006.01)

(56) References Cited

U.S. PATENT DOCUMENTS

| | | | |
|---|---|---|---|
| 2017/0078029 A1 | 3/2017 | Qi | |
| 2018/0234236 A1* | 8/2018 | Djordjevic | H04B 7/0413 |
| 2018/0241553 A1* | 8/2018 | Lucamarini | H04B 10/54 |
| 2018/0294961 A1* | 10/2018 | Wang | H04L 9/0852 |
| 2018/0316496 A1* | 11/2018 | Qi | H04B 10/516 |
| 2018/0375650 A1* | 12/2018 | Legre | H04L 9/0858 |
| 2019/0199523 A1* | 6/2019 | Alleaume | H04L 9/0852 |
| 2019/0222416 A1* | 7/2019 | Liang | H04L 9/0858 |
| 2019/0245685 A1* | 8/2019 | Yoshino | H04B 10/516 |
| 2020/0044835 A1* | 2/2020 | Legre | H04B 10/70 |
| 2020/0044836 A1* | 2/2020 | Kim | H04L 9/12 |
| 2020/0050959 A1* | 2/2020 | Ashrafi | H04L 9/0852 |
| 2020/0067704 A1* | 2/2020 | Zbinden | H04L 9/0858 |
| 2020/0099520 A1* | 3/2020 | Legre | H04L 9/0852 |

FOREIGN PATENT DOCUMENTS

| | | |
|---|---|---|
| CN | 103414553 A | 11/2013 |
| CN | 203368495 U | 12/2013 |
| CN | 104468093 A | 3/2015 |
| CN | 105897413 A | 8/2016 |
| CN | 106100837 A | 11/2016 |
| CN | 106324613 A | 1/2017 |
| CN | 205912067 U | 1/2017 |
| WO | 2016099565 A1 | 6/2016 |
| WO | 2017030532 A1 | 2/2017 |

OTHER PUBLICATIONS

Daniel B. S. Soh et al.: "Self-Referenced Continuous-Variable Quantum Key Distribution Protocol", Physical Review X 5, 041010 (2015). pp. 041010-1-041010-15.
Paul Jouguet et al. "Experimental demonstration of long-distance continuous-variable quantum key distribution", Letters, Published Online: Apr. 14, 2013, pp. 378-381.
Juan Huang et al. "High-speed continuous-variable quantum key distribution without sending a local oscillator", Letter, vol. 40, No. 16 / Aug. 15, 2015 / Optics Letters, pp. 3695-3698.
Chao Wang et al. "25 MHz clock continuous-variable quantum key distribution system over 50 km fiber channel", . Scientific Reports, 2015. pp. 1-8.
Office Action dated Nov. 28, 2019, issued in counterpart CN application No. 201710271787.9, with English translation.
International Search Report dated Jun. 27, 2018, issued in counterpart CN application No. PCT/CN2018/082259, with English translation.

* cited by examiner

SIGNAL RECEIVING APPARATUS AND METHOD

CROSS-REFERENCE TO RELATED APPLICATIONS

This application is a continuation of International Application No. PCT/CN2018/082259, filed on Apr. 9, 2018, which claims priority to Chinese Patent Application No. 201710271787.9, filed on Apr. 24, 2017. The disclosures of the aforementioned applications are hereby incorporated by reference in their entireties.

TECHNICAL FIELD

This application relates to the field of communication technologies, and in particular, to an apparatus and a method for receiving a quantum optical pulse signal and a local-frequency optical pulse signal for adjusting self-referenced continuous-variable quantum key distribution (Self-Referenced Continuous-Variable Quantum Key Distribution, SR-CV-QKD).

BACKGROUND

As communications technologies become increasingly mature, communication speeds are increasingly high, and people are beginning to pay increasing attention to communication security. Quantum cryptography communication is a new communications technology combining quantum properties and conventional cryptography. Security in a communication transmission process is ensured by basic principles and properties of quantum mechanics. Developing for more than three decades, Quantum cryptography communication has now begun to find practical usage on the market.

Quantum cryptography communication is mainly used for key distribution, namely, quantum key distribution (Quantum Key Distribution, QKD). A QKD system is configured to generate and distribute a quantum key. This quantum key is used to encrypt classical information, enhancing security in a transmission process of classical information. A one-way QKD system is used as an example. An operating principle of the system is: A sender side randomly encodes a string of information for a quantum optical pulse signal in a quantum state; the information is detected by a detector of a receiver side after being transmitted through a quantum channel; and then the sender side and the receiver side run classical channel procedures such as data comparison, so that the sender side and the receiver side finally share a same group of secure random number keys.

Currently, there are two QKD manners: discrete-variable quantum key distribution (Discrete-Variable Quantum Key Distribution, DV-QKD) and continuous-variable quantum key distribution (Continuous-Variable Quantum Key Distribution, CV-QKD). Being discrete and continuous, it is indicated whether the randomly encoding information in a quantum state is discrete or continuous.

In DV-QKD, key distribution is implemented by encoding a single-photon signal, and therefore high detection accuracy and a single-photon detector that works in a low-temperature environment are required. However, these are not required in CV-QKD, and a balanced homodyne detector is used instead. Therefore, CV-QKD is more practicable. Moreover, properties of CV-QKD make CV-QKD well compatible with a current wavelength division multiplexing network.

FIG. 1 shows a conventional CV-QKD system. As shown in FIG. 1, in a conventional CV-QKD system solution, a continuous laser light source of a sender side (referred to as Alice) generates a periodic optical pulse signal through chopping by an amplitude modulator. A 1:9 beam glitter splits the optical pulse signal into two signals, and a pulse signal with a higher light intensity is directly input into one end of a polarization coupler as an associated local-frequency optical pulse signal. For the other pulse with a lower light intensity, random parameter modulation continues to be performed by using an amplitude and phase modulator. By loading a corresponding voltage on the modulator, a to-be-sent random number may be encoded onto a regular component of the signal with a lower light intensity. A faraday rotation mirror in this modulation line is configured to change polarization of the pulse signal so that the signal rotates by 90° on an original polarization basis (this means that polarization of the optical pulse signal is perpendicular to polarization of the local-frequency optical pulse signal). In addition, the optical pulse signal goes for another length of optical path, and is then attenuated by an attenuator to become a quantum optical pulse signal that is input into another end of the polarization coupler. In this way, this quantum optical pulse signal can be transmitted together with the local-frequency optical pulse signal in the other line in an optical fiber through polarization-division multiplexing and time-division multiplexing. Because an intensity of the local-frequency light is much higher than that of the quantum optical pulse signal, the local-frequency light tends to cause crosstalk to the quantum optical pulse signal. Therefore, the polarization-division multiplexing and time-division multiplexing are used to increase isolation between the local-frequency light and the signal light.

At the receiver side (usually referred to as Bob), a polarization state of the input signal is controlled and adjusted in real time by using a dynamic polarization controller, so that when the input signal passes through a subsequent polarization optical splitter, the quantum optical pulse signal is completely output from one end, and the associated local-frequency optical pulse signal is completely output from another end. The associated local-frequency optical pulse signal needs to pass through a phase modulator for random selection of a measurement base, and pass through an unequal arm optical path apparatus the same as that of the sender side for time delay compensation for the local-frequency optical pulse signal, thereby ensuring that the quantum optical pulse signal and the local-frequency light that are input into a 2×2 coupler are aligned in timing. Two output ends of the 2×2 coupler are connected to two input ends of a balanced receiver. After data of an electrical signal output by using the balanced receiver is collected, initial data obtained in some data processing methods is usually referred to as a raw key (raw key).

In the conventional CV-QKD system solution, an associated local-frequency light manner is used, to be specific, when a quantum optical pulse signal is transmitted, a classical optical pulse signal of a higher light intensity is also transmitted as a local-frequency optical pulse signal. Because this local-frequency optical pulse signal interferes greatly with the quantum optical pulse signal, to minimize interference, a manner in which a quantum optical pulse signal and a local-frequency optical pulse signal are time-division multiplexed is usually used in practice. To be specific, a pulse of the quantum optical pulse signal pulse is delayed for a length of time at the sender side, so that the quantum optical pulse signal and the associated local-frequency optical pulse signal are transmitted at different times.

However, this requires that a delay compensation of the same length of time be applied to the local-frequency light at the receiver side. Therefore, optical fibers of a same length for delay adjustment heed to be made for both the receiver side and the sender side, which is of great difficulty. In addition, the local-frequency optical pulse signal is related to a measurement level of vacuum noise of a balanced detector at the receiver side, and therefore an intensity change of the local-frequency optical pulse signal may affect a detection result. If the change is implemented by a third-party eavesdropper, system security may be affected (a local-frequency optical pulse signal attack).

A self-referenced continuous-variable quantum key distribution (SR-CV-QKD) solution is proposed in March, 2015 by both Bing Qi et al. in "Generating the local oscillator "locally" in continuous-variable quantum key distribution based on coherent detection" and Daniel B. S. Soh et al. in "Self referenced continuous-variable quantum key distribution". Local-frequency light generation is moved from a sender side as in a conventional CV-QKD system to a receiver side, and to ensure that an interference result between a local-frequency optical pulse signal generated at the receiver side and a quantum optical pulse signal light sent by the sender side can be parsed, a reference pulse with a higher light intensity is introduced between quantum optical pulse signals sent by the sender side. This reference pulse may be referred to as reference light, used to detect a frequency difference and a phase difference between the quantum optical pulse signal light sent by the sender side and the local-frequency optical pulse signal of the receiver side. In this way, measuring machine selection is implemented in the CV-QKD system, and information in the quantum optical pulse signal is recovered. Using this solution does not require that a length of an optical fiber at the sender side and that at the receiver side be strictly controlled to be equal. In addition, the reference pulse has a much lower intensity than the local-frequency optical pulse signal sent by the sender side of the conventional CV-QKD system, causing less interference to the quantum optical pulse signal. Therefore, a hidden risk of a local-frequency optical pulse signal attack coming with the sending of the local-frequency optical pulse signal, is eliminated.

In the SR-CV-QKD system solution, estimation is performed through measurement of a phase difference between the local-frequency light and the reference light. This estimation is on a basis that the reference signal and the quantum signal light have extremely approximate pulses in a time domain, and that the two signals have both been transmitted on a same segment of a channel. Therefore, the estimation may be performed by approximately considering that a phase of the reference light, changing in the transmission process, is the same as that of a pulse of neighboring quantum signal light, or by using an average value of a pulse phase of the reference light before the quantum signal light and a pulse phase of the reference light after the quantum signal light. However, because the local-frequency optical pulse signal and the quantum optical pulse signal is not generated by one laser, a delay between the local-frequency optical pulse signal and the quantum optical pulse signal needs to be adjusted so that the local-frequency optical pulse signal and the quantum optical pulse signal are aligned in timing, ensuring optimum interference. Currently, timing alignment is implemented by using an optical delay line. However, a tiny fluctuation, if occurring in an optical transmission path, leads to a timing jitter of a signal pulse, resulting in an extra delay and unaligned timing between the two signals. To ensure timing alignment, the optical delay line needs to be adjusted continually. This results in relatively low timing alignment efficiency.

SUMMARY

Embodiments of this application provide a signal receiving apparatus and method. A reference pulse signal in an optical pulse signal is detected, and an modulation pulse signal is obtained based on the reference pulse signal, so as to obtain a first local-frequency optical pulse signal having same timing as the optical pulse signal, and further obtain a raw key. Therefore, the first local-frequency optical pulse signal and a quantum optical signal are aligned in timing, and timing alignment efficiency between the two signals is improved.

According to a first aspect, an embodiment of this application provides a signal receiving apparatus, and the receiving apparatus may include:

a signal receiving module, configured to detect a reference pulse signal in a received optical pulse signal, where the optical pulse signal includes the reference pulse signal and a quantum optical pulse signal; and a synchronization clock module, configured to obtain a modulation pulse signal based on the reference pulse signal; where a first intensity modulator in the signal receiving module is configured to obtain, based on the modulation pulse signal, a first local-frequency optical pulse signal having same timing as the optical pulse signal, and the signal receiving module uses the first local-frequency optical pulse signal to interfere with the reference pulse signal and the quantum optical pulse signal separately, to obtain a raw key.

According to a second aspect, an embodiment of this application provides a signal receiving method, and the receiving method may include:

detecting a reference pulse signal in a received optical pulse signal, where the optical pulse signal includes the reference pulse signal and a quantum optical pulse signal;

determining a modulation pulse signal based on the reference pulse signal;

obtaining, based on the modulation pulse signal, a first local-frequency optical pulse signal having same timing as the optical pulse signal; and using the first local-frequency optical pulse signal to interfere with the reference pulse signal and the quantum optical pulse signal, to obtain a raw key.

DESCRIPTION OF EMBODIMENTS

Embodiments of this application provide a signal receiving apparatus and method, and the receiving apparatus and method are applied to an SR-CV-QKD system. The receiving apparatus in the SR-CV-QKD system receives an optical pulse signal sent by a sending apparatus, where the optical pulse signal includes a quantum optical signal of a reference pulse signal. The receiving apparatus: (1) detects the reference pulse signal in the optical pulse signal, (2) determines information such as timing information and polarization information of the reference pulse signal, (3) determines, based on the timing information of the reference pulse signal, a modulation pulse signal used to generate a first local-frequency optical pulse signal having same timing as the optical pulse signal, (4) determines modulation information used to adjust an intensity of the first local-frequency optical pulse signal, (5) determines polarization adjustment information based on the polarization information of the reference pulse signal, (6) adjusts, based on the modulation pulse signal, the modulation information, and the polarization information, the first local-frequency optical pulse signal to obtain a first local-frequency optical pulse whose timing information and polarization information are aligned with those of the optical pulse signal, and (7) uses the first local-frequency optical pulse signal to interfere with the reference pulse signal and the quantum optical pulse signal separately, to obtain a raw key.

The raw key is an initial key detected by the receiving apparatus. A quantum key is obtained after a series of processing is performed on the raw key by the receiving apparatus.

Figure 1:
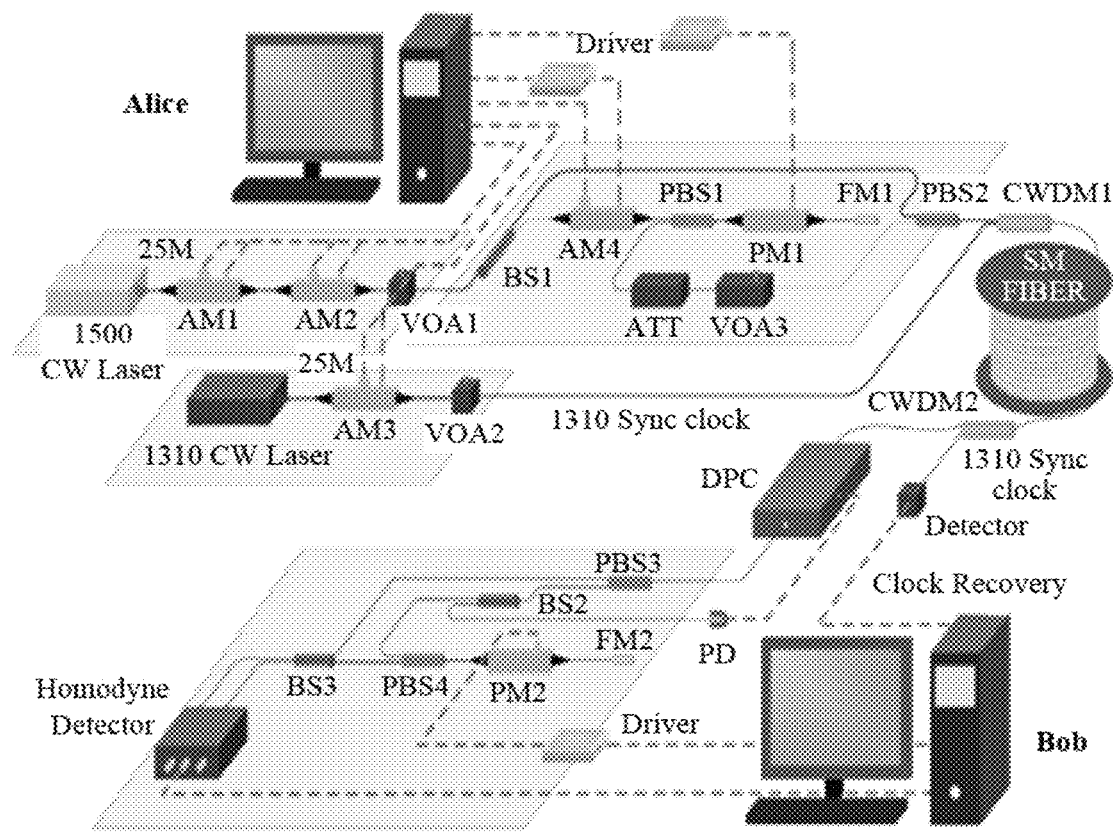
FIG. 1 is a schematic structural diagram of a conventional continuous-variable quantum key distribution system.
Figure 2:
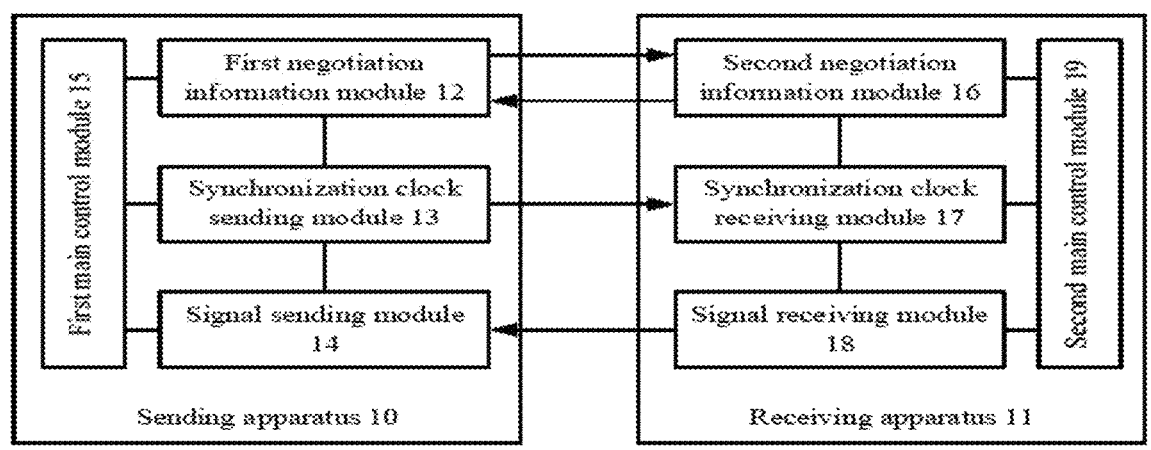
FIG. 2 is a structural block diagram of a one-way SR-CV-QKD system according to an embodiment of this application.

An SR-CV-QKD system is shown in FIG. 2, and FIG. 2 is a structural block diagram of a one-way SR-CV-QKD system. As shown in FIG. 2, the SR-CV-QKD system may include a sender side and a receiver side, or referred to as a sending apparatus 10 and a receiving apparatus 11. Divided by logical functions, the sending apparatus 10 may include a first negotiation information module 12, a synchronization clock sending module 13, a signal sending module 14, and a first main control module 15, and the receiving apparatus 11 may include a second negotiation information module 16, a synchronization clock receiving module 17, a signal receiving module 18, and a second main control module 19. In the embodiments of this application, for ease of description, the synchronization clock receiving module 17 is simply referred to as a synchronization clock module.

The first main control module 15 in the sending apparatus 10 is configured to control the first negotiation information module 12, the synchronization clock sending module 13, and the signal sending module 14 in the sending apparatus 10 to perform corresponding operations, and the second main control module 19 in the receiving apparatus 11 is configured to control the second negotiation information module 16, the synchronization clock receiving module 17, and the signal receiving module 18 in the receiving apparatus 11 to perform corresponding operations.

The solution provided in this embodiment of this application mainly relates to the receiving apparatus 11 in the SR-CV-QKD system, and in particular, to the synchronization clock receiver and the quantum signal receiver in the receiving apparatus 11.

The sending apparatus 10 is configured to output an optical pulse signal carrying a quantum key to the receiving apparatus 11, and the optical pulse signal includes a reference pulse signal of the quantum optical pulse signal. In this embodiment of this application, an intensity of the reference pulse signal may be approximately 1000 times that of the quantum optical pulse signal. In addition, the reference pulse signal and the quantum optical pulse signal may be configured based on a specific relationship. For example, there is one quantum optical pulse signal between every two reference pulse signals, or there is one quantum optical pulse signal following every two reference pulse signals. This is to help the receiving apparatus 11 estimate, after detecting the reference pulse signal in the optical pulse signal, information of the quantum optical information based on the relationship between the reference pulse signal and the quantum optical pulse signal.

The signal receiving module 18 in the receiving apparatus 11 receives the optical pulse signal sent and output by the sending apparatus 10, and detects the reference pulse signal in the optical pulse signal; recovers timing information of the reference pulse signal by using the synchronization clock module 17, and recovers clock information of the optical pulse signal based on the timing information of the reference pulse signal; and the receiving apparatus 11 generates a corresponding modulation pulse signal based on the recovered clock information of the optical pulse signal and chops, based on the modulation pulse signal, continuous laser light generated by a local laser, to form a local-frequency optical pulse signal, where frequency distribution and time-domain distribution of the local-frequency optical pulse signal are consistent with those of the optical pulse signal. The local-frequency optical pulse signal is the first local-frequency optical pulse signal mentioned in this application.

The receiving apparatus 11 may further determine modulation information based on the timing information of the reference pulse signal, and adjust a signal intensity of the first local-frequency optical pulse signal based on the modulation information, so that the receiving apparatus 11 provided in this embodiment of this application can meet detection requirements of pulse signals of different intensities by using one balanced detector.

In addition, the receiving apparatus 11 may further detect polarization information of the reference pulse signal, to determine polarization adjustment information based on the polarization information, thereby adjusting a polarization direction of the first local-frequency optical pulse signal based on the polarization adjustment information, so that an adjusted polarization direction is the same as a polarization direction of the optical pulse signal, and optimum interference between the first local-frequency optical pulse signal and the optical pulse signal is achieved.

The synchronization clock module 17 is used to recover the timing information of the reference pulse signal. The signal receiving module 18 receives the polarization information of the reference pulse signal, and adjusts, based on the polarization information, a frequency, a delay, a light intensity, and polarization of the first local-frequency optical pulse signal generated by the receiving apparatus 11, thereby ensuring that the local-frequency optical pulse signal generated by the receiving apparatus 11 and the received optical pulse signal are aligned in timing and polarization, to achieve optimum interference, and further obtain a raw key.

The following describes the technical solutions in the embodiments of this application in detail with reference to the accompanying drawings. It should be noted that the "first" and "second" mentioned in the embodiments of this application are merely for distinguishing, and do not construe any limitation thereupon.

Figure 3:
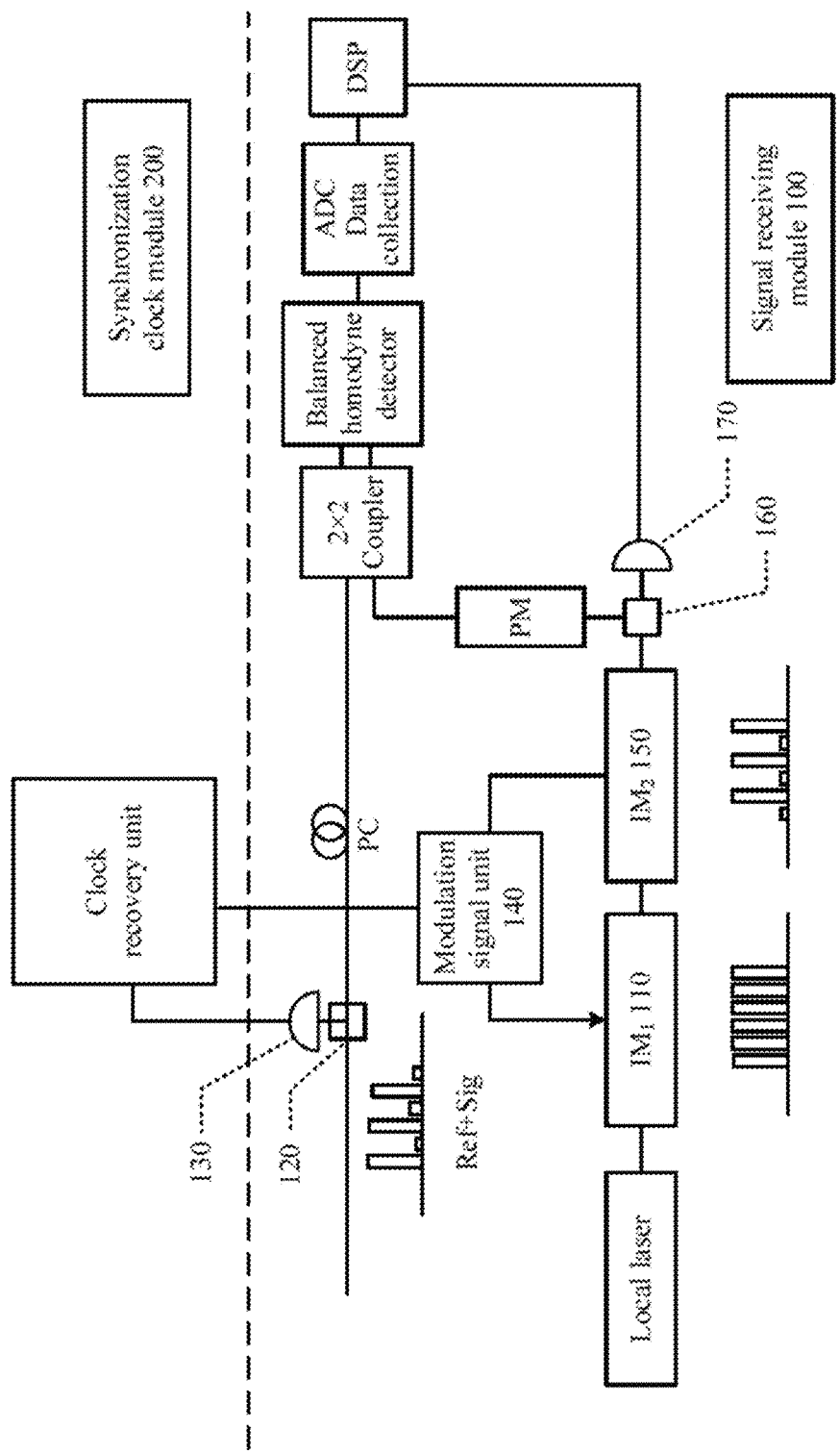
FIG. 3 is a schematic structural diagram of a self-referenced continuous-variable quantum key distribution adjusting system according to an embodiment of this application.

FIG. 3 is a schematic structural diagram of a self-referenced continuous-variable quantum key distribution adjusting system according to an embodiment of this application. As shown in FIG. 3, a receiving apparatus may include a signal receiving module 100 and a synchronization clock module 200, and the signal receiving module includes a first intensity modulator $IM_1$ 110.

The signal receiving module 100 is configured to detect a reference pulse signal in a received optical pulse signal, where the optical pulse signal includes the reference pulse signal and a quantum optical pulse signal.

The synchronization clock module 200 is configured to obtain a modulation pulse signal based on the reference pulse signal.

The first intensity modulator $IM_1$ 110 in the signal receiving module 100 is configured to obtain, based on the modulation pulse signal, a first local-frequency optical pulse signal having same timing as the optical pulse signal, and the signal receiving module 100 uses the first local-frequency optical pulse signal to interfere with the reference pulse signal and the quantum optical pulse signal separately, to obtain a raw key.

In this embodiment of this application, after receiving the optical pulse signal sent by the sending apparatus, the receiving apparatus detects the reference pulse signal in the optical pulse signal, and estimates the quantum optical pulse signal based on the timing information of the reference pulse signal.

In addition, because the reference pulse signal and the quantum optical pulse signal in the optical pulse signal may be transmitted based on a specific relationship. For example, there is one quantum optical pulse signal between every two reference pulse signals, or there is one quantum optical pulse signal following every two reference pulse signals. In this case, there is a simple proportional frequency relationship between the optical pulse signal and the reference pulse signal, and based on this proportional relationship, the timing information of the reference pulse signal may be obtained during detection of the reference pulse signal, and further the clock information of the optical pulse signal is recovered.

In this embodiment of this application, the synchronization clock module 200 may include a clock recovery unit that generates a corresponding modulation pulse signal based on the clock information of the optical pulse signal. The first intensity modulator $IM_1$ 110 obtains, based on the modulation pulse signal, the first local-frequency optical pulse signal having same timing as the optical pulse signal, so that interference is generated between the first local-frequency optical pulse signal and the optical pulse signal to obtain the raw key and further obtain a quantum key.

In this embodiment of this application, the receiving apparatus detects the reference pulse signal in the optical pulse signal, generates the modulation pulse signal based on the reference pulse signal, and obtains the first local-frequency optical pulse signal, where the first local-frequency optical pulse signal and the optical pulse signal are aligned in timing. Compared with the prior art, in which timing of a first local-frequency optical pulse signal and timing of the first local-frequency optical pulse signal are aligned by adjusting optical fibers for delay adjustment, the apparatus provided in this embodiment of this application can more easily and efficiently align the timing of the first local-frequency optical pulse signal and the timing of the optical pulse signal, so as to obtain the raw key, and further obtain the quantum key.

Optionally, the synchronization clock module 200 is configured to obtain a modulation pulse signal based on the reference pulse sign by determining, by the synchronization clock module 200, the clock information of the optical pulse signal based on the reference pulse signal, and obtaining the modulation pulse signal based on the clock information, so that the first intensity modulator $IM_1$ 110 chops, based on the modulation pulse signal, continuous laser light generated by a local laser, and the first local-frequency optical pulse signal is formed.

The $IM_1$ 110 chops the continuous laser light generated by the local laser based on a following chopping principle: performing, by loading an electrical pulse signal, time-related processing on the continuous laser light passing through the $IM_1$ 110. This may be figuratively understood as performing an on/off operation, and frequency distribution and time-domain distribution of the finally formed pulse signal are consistent with frequency distribution and time-domain distribution of the loaded electrical pulse signal.

In this embodiment of this application, the clock information of the optical pulse signal, that is, frequency distribution and time-domain distribution information of the optical pulse signal, is obtained from the synchronization clock module 200, and a corresponding electrical pulse signal may be generated based on this information. Based on this electrical pulse signal, the continuous laser generated by the local laser is chopped by using the $IM_1$ 110 to obtain the first local-frequency optical pulse signal whose frequency distribution and time-domain distribution are consistent with those of the optical pulse signal.

In addition, a time T1 from when the optical pulse signal received by the receiving apparatus is transmitted from a first beamsplitter 120 to when the signal arrives at a 2*2 coupler is known, a time T2 from when the reference pulse signal is detected after the beamsplitting to obtain the modulation pulse signal to when the modulation pulse signal arrives at the $IM_1$ 110 is known, and a time T3 from when the local-frequency optical pulse signal is transmitted from the $IM_1$ 110 to when the signal arrives at the 2*2 coupler is known. If there is no additional modulation, when the local local-frequency optical pulse formed by chopping and the received optical pulse signal arrive at the 2*2 coupler to interfere with each other, the local local-frequency pulse and the received optical pulse signal are staggered for a T1−T2−T3 time in a time domain. To make the local-frequency optical pulse signal and the quantum optical pulse signal are aligned in timing, the only thing to do is to let T1−T2−T3=0.

In this embodiment of this application, T1−T2−T3=0 may be implemented by using the following two manners.

Manner 1: Because the time T2 is decided by a circuit, a proper T1 and a proper T3 are selected by designing an optical path length of the optical pulse signal and an optical path of the first local-frequency optical pulse signal, to make true T1−T2−T3=0.

This manner requires a specific optical path length, and a highly accurate optical path length is required in an implementation process. Making such a fiber is relatively troublesome.

Manner 2: When the optical path remains unchanged, that is, T1 and T3 remain unchanged, T2 is adjusted by adjusting the modulation pulse signal loaded on the $IM_1$ 110, to make true T1−T2−T3=0.

This manner requires corresponding adjustment of a manner in which the modulation pulse signal loaded on the $IM_1$ 110 is generated. For example, a delay chip is added to adjust a delay for generation of the modulation pulse signal, or corresponding processing is added to generation of the modulation pulse signal. In this embodiment of this application, T1−T2−T3=0 can be more easily implemented by using manner 2 than manner 1.

Figure 4A:
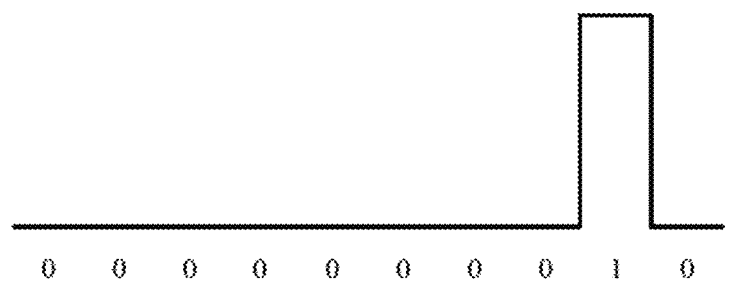
FIG. 4(a) is a schematic diagram of a modulation pulse signal according to an embodiment of this application.
Figure 4B:
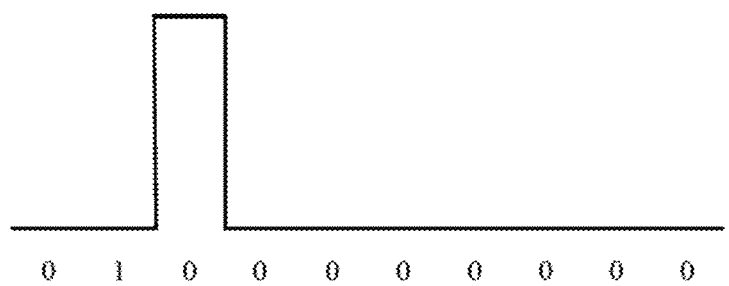
FIG. 4(b) is a schematic diagram of another modulation pulse signal according to an embodiment of this application.

In this embodiment of this application, frequency distribution and time-domain distribution of the modulation pulse signal loaded on the $IM_1$ 110 are simulated by using digital information provided by a logical function chip. As shown in FIG. 4(a), an electrical pulse with specific frequency distribution and time-domain distribution is simulated through arrangement and distribution of digital information. This modulation pulse signal decides frequency distribution and time-domain distribution information of a modulated first local-frequency optical pulse signal. As shown in FIG. 4(b), by changing the arrangement and distribution of digital information, the time-domain distribution of the modulation pulse signal is changed. It can be learned from FIG. 4(a) and FIG. 4(b) that the electrical pulse generated in FIG. 4(a) has a delay in time relative to that generated in FIG. 4(b), and based on this, the first local-frequency optical pulse signal generated through chopping by the $IM_1$ 110 has same frequency distribution and time-domain distribution as the optical pulse signal. Considering periodicity, this difference of FIG. 4(a) from FIG. 4(b) is equivalent that several digits "0" are added before a start point.

It should be noted that a prerequisite for obtaining the modulation pulse signal by the receiving apparatus in this embodiment of this application is that a reference pulse signal is detected. Therefore, whatever kind of change occurs in a transmission optical path to cause an additional delay in transmission of the optical pulse signal does not impact alignment between the optical pulse signal and the first local-frequency optical pulse signal.

By using the receiving apparatus provided in this embodiment of this application, compared with the prior art, timing alignment between the first local-frequency optical pulse signal and the optical pulse signal may be more efficiently completed.

Optionally, as shown in FIG. 3, the signal receiving module 100 may further include a first beamsplitter 120 and a first detector 130. The signal receiving module 100 is configured to detect the reference pulse signal in the received optical pulse signal by splitting, the first beamsplitter 120, the received optical pulse signal, and detecting, by the first detector 130, a reference pulse signal in a separated optical pulse signal.

The optical pulse signal includes the reference pulse signal and the quantum optical pulse signal.

At an optical fiber input interface of the receiving apparatus, the first beamsplitter 120 performs light splitting processing for the received optical pulse signal, and detects, by using the first detector 130, the reference pulse signal in the optical pulse signal separated through the light splitting. The first detector 130 may be a classical photoelectric detector.

Beamsplitting configuration of the first beamsplitter 120 needs to be properly selected based on a line attenuation condition of the SR-CV-QKD system. Because in the SR-CV-QKD system, a light intensity of the reference pulse signal may be approximately 1000 times that of the quantum optical pulse signal (the light intensity of the quantum optical pulse signal is approximately 10 photons per optical pulse), after a specific proportion is separated out by the first beamsplitter 120, it needs to be ensured that an intensity of a reference pulse signal in a separated optical pulse signal can still be detected by the classical photoelectric detector. In addition, the first beamsplitter 120 needs to ensure that additional attenuation generated by a quantum optical pulse signal in an optical pulse signal that is not separated is within a specified range, and this range is an acceptable range for the SR-CV-QKD system. Otherwise, the SR-CV-QKD system may not be able to generate a security key.

For example, in an embodiment of this application, the first beamsplitter 120 may be selected to be a 1:9 beamsplitter. In this case, a light intensity of the reference pulse signal in the separated optical pulse signal is still relatively high, and only 1 dB additional attenuation is introduced to a quantum optical pulse signal in the finally measured optical pulse signal. This is acceptable to the SR-CV-QKD system in a case of a short transmission distance.

The first detector 130 is a photoelectrical detector. The first detector 130 detects reference pulse signals in the optical signal, to obtain each reference pulse signal that is converted into an electrical pulse signal. When the first detector 130 detects the reference pulse signal in the optical pulse signal, because a light intensity of the quantum optical pulse signal in the optical pulse signal is extremely low, it may be considered that the first detector 130 cannot respond to the quantum optical pulse signal, and a corresponding electrical pulse signal cannot be generated either. Then the electrical pulse signal corresponding to the reference pulse signal can be obtained by using the optical pulse signal in the synchronization clock module 200, and frequency distribution and time-domain distribution of the optical pulse signal are consistent with frequency distribution and time-domain distribution of the reference pulse signal.

Optionally, as shown in FIG. 3, the receiving apparatus may further include a signal modulation unit 140 and a second intensity modulator $IM_2$ 150. The second intensity modulator $IM_2$ 150 is connected to the signal modulation unit 140 and the synchronization clock module 200 separately; and the second intensity modulator $IM_2$ 150 is connected to the first intensity modulator $IM_1$ 110.

The synchronization clock module 200 is further configured to determine timing information of the reference pulse signal, the signal modulation unit 140 is further configured to determine modulation information based on the timing information, and the second intensity modulator $IM_2$ 150 is configured to adjust the first local-frequency optical pulse signal based on the modulation information.

In this embodiment of this application, the synchronization clock module 200 obtains frequency information of the reference pulse signal and sends the frequency information to the signal modulation unit 140, so as to load modulation information to the second intensity modulator $IM_2$ 150, where the modulation information is used to adjust an intensity of the first local-frequency optical pulse signal output from the first intensity modulator $IM_1$ 110 to the second intensity modulator $IM_2$ 150.

In an embodiment of this application, the second intensity modulator $IM_2$ 150 adjusts, based on the modulation information, the first local-frequency optical pulse signal into local-frequency optical pulses of two intensities: a second local-frequency optical pulse signal and a third local-frequency optical pulse signal.

In this embodiment of this application, the second local-frequency optical pulse signal interferes with the quantum optical pulse signal, and the third local-frequency optical pulse signal interferes with the reference pulse signal, where an intensity of the second local-frequency optical pulse signal is greater than an intensity of the third local-frequency optical pulse signal.

In other words, a local-frequency optical pulse signal with a higher intensity in the modulated local-frequency optical pulse signals of two intensities interferes with the received quantum optical pulse signal, and a local-frequency optical pulse signal with a lower intensity interferes with the received reference pulse signal.

In this embodiment of this application, as shown in FIG. 3, the signal receiving module 100 may further include a balanced homodyne detector. An input end of the balanced homodyne detector is connected to a phase modulator PM by using a second beamsplitter 160 in the signal receiving module 100, and the second beamsplitter 160 is connected to the second intensity modulator $IM_2$ 150.

In the SR-CV-QKD system, the balanced homodyne detector is used to perform detection, and a detection result of the balanced homodyne detector has a direct relationship with a square of a product of intensities of the two lines of interference light (namely, interference light between the local-frequency optical pulse signal with the higher intensity and the quantum optical pulse signal, and interference light between the local-frequency optical pulse signal with the lower intensity and the reference pulse signal). Therefore, if local-frequency optical pulse signals with a same intensity are used to interfere with the received optical pulse signal (including the higher-intensity reference pulse signal and the lower-intensity quantum optical pulse signal), an intensity of the interference light corresponding to the reference pulse signal detected by the balanced homodyne detector is approximately 30 times different from an intensity of the interference light corresponding to the quantum optical pulse signal because the intensity of the reference pulse signal is approximately 1000 times that of the quantum optical pulse signal.

Actually, an output range of the balanced homodyne detector is fixed and limited. When measurement output of the reference pulse signal is not saturated, measurement output for the quantum optical pulse signal accounts for only less than 1/30 of the output range of the balanced homodyne detector. Then data sampling is performed by using an analog to digital converter A/D converter, or referred to as an ADC (analog to digital converter). In this case, a utilized dynamic AD/DA range is not reasonable. This imposes a specific impact on measurement accuracy of the quantum optical pulse signal. As the quantum optical pulse signal is a carrier of key information, a best possible accurate measurement result for the signal is desired.

Therefore, in this embodiment of this application, local-frequency optical pulse signals of different intensities are used to interfere with the reference pulse signal and the quantum optical pulse signal in the optical pulse signal. For example, a local-frequency optical pulse signal with an intensity $I_1$ interferes with the reference pulse signal, and a local-frequency optical pulse signal with an intensity $I_2$ interferes with the quantum optical pulse signal, and $I_1$ and $I_2$ have a relationship $I_2 \approx 1000 I_1$. In this case, when the balanced homodyne detector is used to detect the reference pulse signal and the quantum optical pulse signal, a detection result for the reference pulse signal is approximate to a detection result for the quantum optical pulse signal. Therefore, sampling for measurement output for the quantum optical pulse signal can make full use of the dynamic AD/DA range of the ADC, and a more accurate measurement result can be obtained.

An extinction ratio of an intensity modulator using a current technology may be made to be approximately 30 dB. In principle, two local-frequency optical pulse signals whose intensities are different by approximately 1000 times can be modulated by using only one intensity modulator.

In this embodiment of this application, one part of the local-frequency optical pulse signal interferes with the reference pulse signal in the optical pulse signal, and the other part of the local-frequency optical pulse signal interferes with the quantum optical pulse signal in the optical pulse signal. The second intensity modulator $IM_2$ 150 is configured to: when the local-frequency optical pulse signal used to interfere with the reference pulse signal arrives, attenuate the local-frequency optical pulse signal, and when the local-frequency optical pulse signal interfering with the quantum optical pulse signal arrives, skip attenuating the local-frequency optical pulse signal.

Optionally, in this embodiment of this application, to implement the foregoing functions of the second intensity modulator $IM_2$ 150, a rectangular wave signal may be loaded on the second intensity modulator $IM_2$ 150, and a frequency and a duty cycle of the rectangular wave signal are consistent with proportions of a frequency and a duty cycle of the quantum optical pulse signal in those of the entire optical pulse signal. The proportions of the frequency and the duty cycle of the quantum optical pulse signal in those of the entire optical pulse signal are complementary with proportions of a frequency and a duty cycle of the reference pulse signal in those of the entire optical pulse signal. For example, the entire optical pulse signal includes a mixture of the reference pulse signal and the quantum optical pulse signal at a ratio 1:1. In this case, the frequency of the square wave signal is consistent with the frequency of the reference pulse signal, a duty circle of the square wave signal is 50%, and an amplitude of the square wave signal meets that a low level makes the $IM_2$ in a maximum attenuation state and that a high level makes the $IM_2$ in a maximum pass-through state.

It should be noted that the frequency of the quantum optical pulse signal may be calculated based on a measured frequency of the reference pulse signal. A specific calculation method has been mentioned above and belongs to the prior art. For ease of description, details are not described herein again.

Optionally, as shown in FIG. 3, the signal receiving module 100 may further include a second beamsplitter 160 and a second detector 170, and the second beamsplitter 160 is connected to the second intensity modulator $IM_2$ 150, the second detector 170, and a phase modulator 180 separately.

The second beamsplitter 160 is configured to separate the second local-frequency optical pulse signal and the third local-frequency optical pulse signal.

The second detector 170 is configured to detect an intensity of the second local-frequency optical pulse signal and an intensity of the third local-frequency optical pulse signal.

An intensity of a local-frequency optical pulse signal affects a vacuum noise level, and the balanced homodyne detector is relevant to the intensity of the local-frequency optical pulse signal. In addition, for the balanced homodyne detector to obtain signal loading information from the measurement result through demodulation, light intensity information of the local-frequency optical pulse signal is also needed.

Therefore, a combination of one beamsplitter and one detector combination is disposed at an output end of the $IM_2$ 150, to detect intensity information of the first local-frequency optical pulse signal, to be specific, the second local-frequency optical pulse signal and the third local-frequency optical pulse signal, modulated by the $IM_2$ 150. In addition, in this embodiment of this application, light intensity jitters of different local-frequency optical pulse signals can be monitored also by using one beamsplitter and one detector, and further a vacuum noise level is calibrated.

Moreover, the detected intensity information is fed back to a final digital signal processor (Digital Signal Processor, DSP) to provide parameters of signal pulse adjustment information to the balanced homodyne detector. It should be noted that the DSP is connected to the balanced homodyne detector as shown in FIG. 3.

By using the receiving apparatus provided in this embodiment of this application, the intensity of the local-frequency optical pulse signal may be adjusted by using the $IM_2$, and optimum gain output can be implemented for the reference pulse signal and the quantum optical pulse signal by using one balanced detector. When the ADC is used to collect detection data of the reference pulse signal and the quantum optical pulse signal, a utilized dynamic AD/DA range is relatively reasonable.

In this embodiment of this application, local-frequency optical pulse signals of different intensities are used. In the following, impacts imposed by intensities of different local-frequency optical pulse signals on the SR-CV-QKD system are described mainly from aspects of security and detection performance.

In the conventional CV-QKD system, an intensity of the local-frequency light is an important parameter to calibrate a vacuum noise level and should remain constant, otherwise a security risk may occur (for example, the local-frequency optical pulse signal is attacked). In the technical solution of this application, in the SR-CV-QKD system, because the local-frequency optical pulse signal is locally generated by the receiving apparatus, it may be considered that there is no outside attack on the local-frequency optical pulse signal. In addition, in the technical solution of this application, the intensity of the local-frequency optical pulse signal is monitored in real time. Therefore, local-frequency optical pulse signals of two different intensities used in this embodiment of this application have no impact on system security.

For the CV-QKD system, there are three types of balanced detection output: electrical noise, vacuum noise, and signal detection results. A vacuum noise level is proportional to an intensity of a local-frequency optical pulse signal. To measure the quantum optical pulse signal (whose light intensity is so low as to be approximate to a single-photo level), the vacuum noise level needs to be significantly higher than (usually at least 10 times higher than) the electrical noise level. A detection result for the quantum optical pulse signal can be distinguished from the detection output only in this way. In the technical solution of this application, local-frequency light of two intensities $I_1$ and $I_2$ are used, and there are also two corresponding vacuum noise levels $N_{01}$ and $N_{02}$. The local-frequency optical pulse signal with the intensity $I_2$ is used to detect the quantum optical pulse signal. The intensity of the local-frequency optical pulse signal is higher and is corresponding to the higher vacuum noise level $N_{02}$. This can meet the foregoing requirement. On the contrary, the local-frequency optical pulse signal with the $I_1$ light intensity is weaker, and the corresponding vacuum noise level $N_{01}$ is lower, where $N_{02} \approx 1000 N_{01}$. When the reference pulse signal is detected, its vacuum noise level is overwhelmed by its electrical noise. However, for the reference pulse signal, its light intensity is relatively high ($10^3$ to $10^4$ photons per pulse), and its signal-to-noise ratio is relatively high. Provided that detection output for the reference pulse signal is high enough in comparison with the electrical noise level, measurement for the reference pulse signal is still feasible.

To sum up the foregoing analysis, the technical solution in this application, in which the local-frequency optical pulse signals of two intensities are used for balanced detection of optical signals, is feasible.

Figure 5:
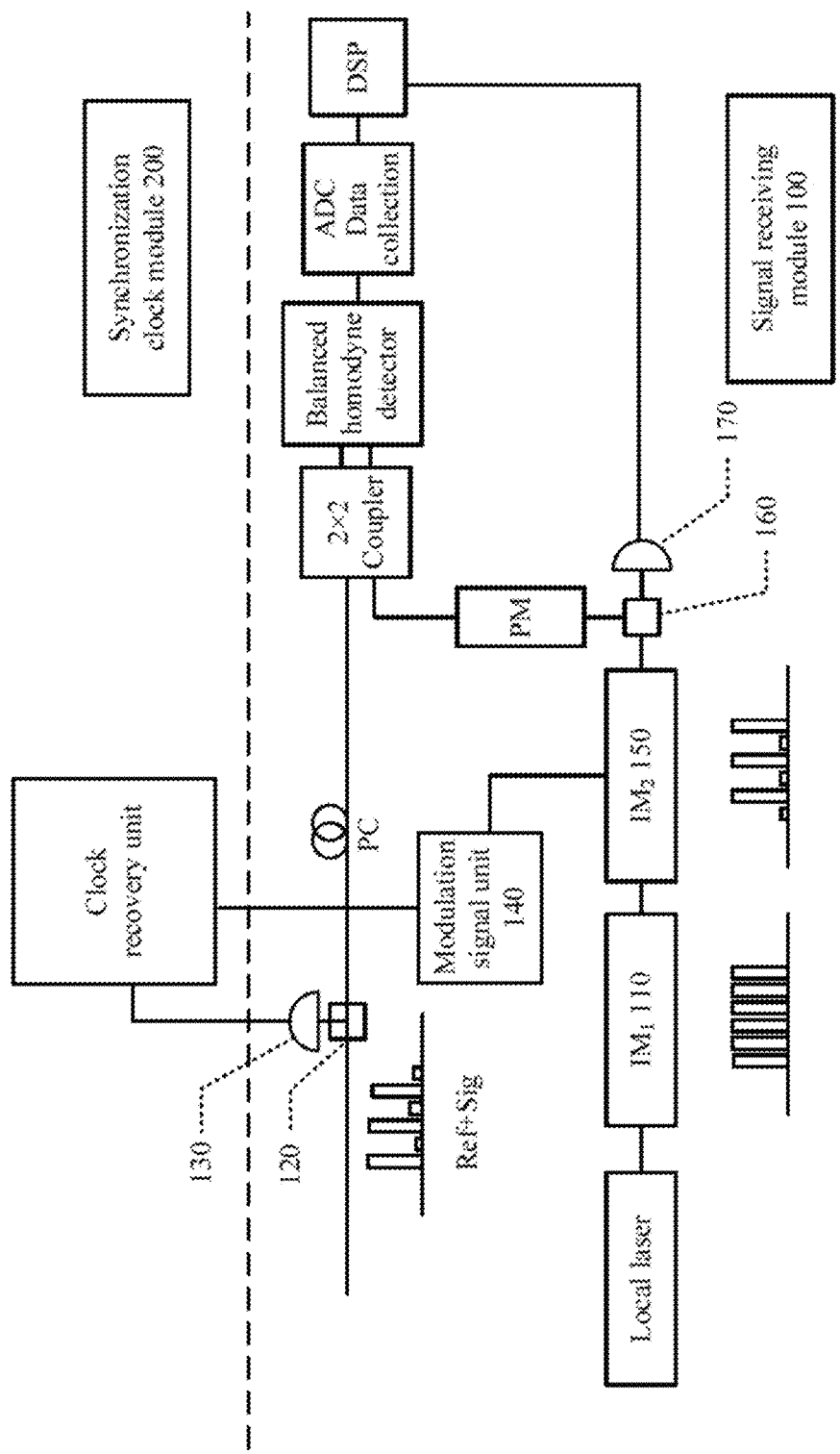
FIG. 5 is a schematic structural diagram of a self-referenced continuous-variable quantum key distribution adjusting system according to an embodiment of this application.

In addition, it should be noted that if the $IM_1$ in this embodiment of the present invention implements timing alignment between the first local-frequency optical pulse signal and the optical pulse signal in another manner, adjustment of the intensity of the first local-frequency optical pulse signal may be implemented by using a self-referenced continuous-variable quantum key distribution adjusting system shown in FIG. 5, to make full use of the dynamic AD/DA range of the ADC, and further to obtain a more accurate measurement result for the quantum optical pulse signal.

Figure 6:
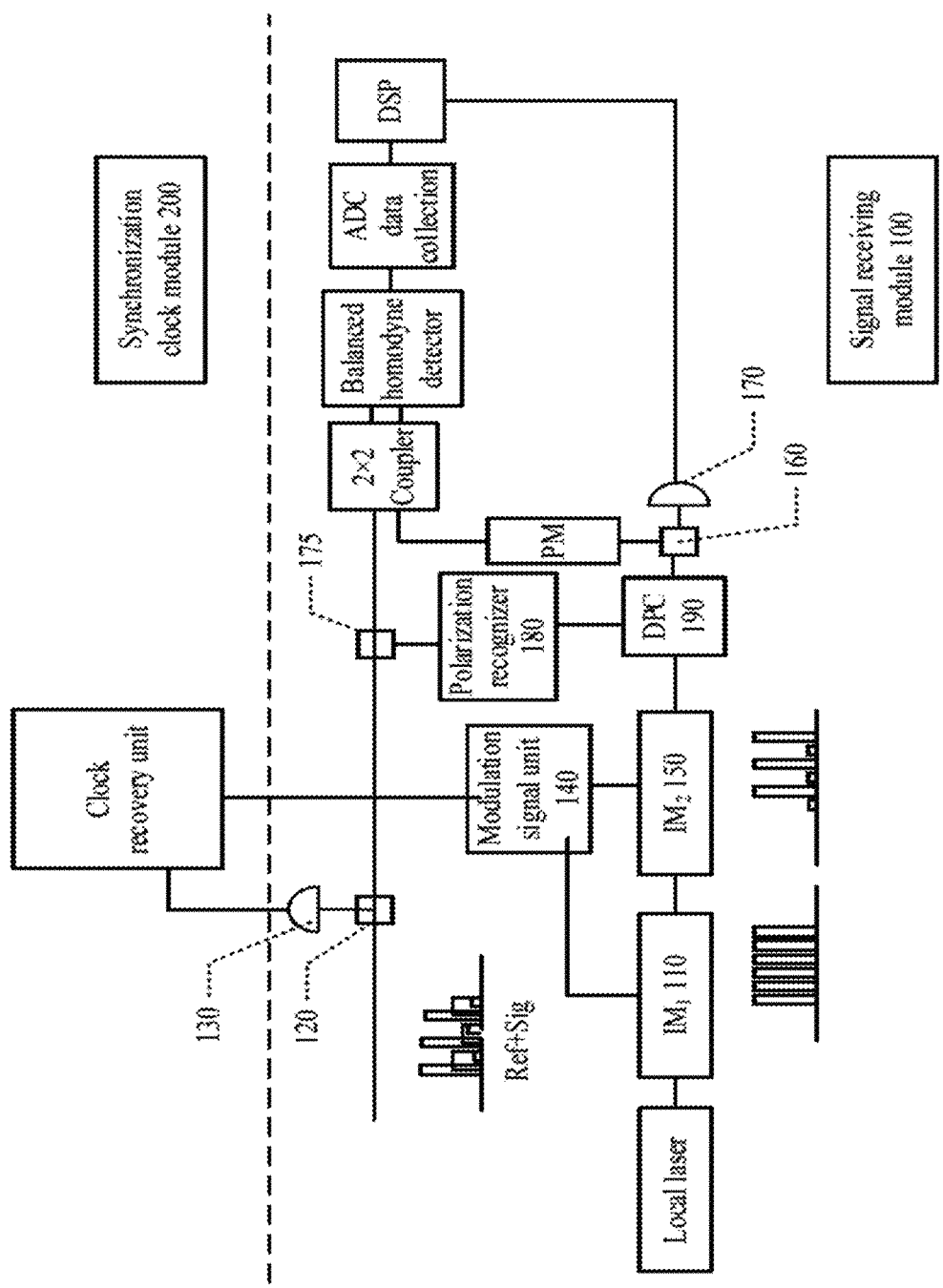
FIG. 6 is a schematic structural diagram of another self-referenced continuous-variable quantum key distribution adjusting system according to an embodiment of this application.

Optionally, as shown in FIG. 6, in this embodiment of this application, the signal receiving module 100 may further include a third beamsplitter 175 and a polarization recognizer 180, where the third beamsplitter 175 is connected to the first beamsplitter 120 and the polarization recognizer 180, or in other words, the first beamsplitter 120 is connected to the polarization recognizer 180 by using the third beamsplitter 175.

The third beamsplitter 175 is configured to receive the optical pulse signal separated by the first beamsplitter 120, and perform beamsplitting on the optical pulse signal.

The polarization recognizer 180 is configured to detect polarization information of a reference pulse signal in an optical pulse signal separated by the third beamsplitter 175, and generate polarization adjustment information based on the polarization information.

In this embodiment of this application, as shown in FIG. 6, the signal receiving module 100 may further include a dynamic polarization controller (Dynamic Polarization Control, DPC) 190, where an input end of the dynamic polarization controller 190 is connected to an output end of the polarization recognizer 180 and an output end of the second intensity modulator $IM_2$ 150, and an output end of the dynamic polarization controller 190 is connected to an input end of the second beamsplitter 160.

The dynamic polarization controller 190 is configured to adjust polarization directions of the second local-frequency optical pulse signal and the third local-frequency optical pulse signal based on the polarization adjustment information, and output the second local-frequency optical pulse signal and the third local-frequency optical pulse signal whose polarization directions are adjusted, to the second beamsplitter 160.

The dynamic polarization controller 190 is disposed behind the $IM_2$, and after detecting the polarization information of the reference pulse signal in the optical pulse signal, the polarization recognizer 180 generates the corresponding polarization adjustment information and feeds back the polarization adjustment information to the dynamic polarization controller 190, to adjust the polarization of the local-frequency light modulated by the $IM_2$, so that a polarization direction of the local-frequency optical pulse information is aligned with a polarization direction of the reference pulse signal, ensuring optimum interference between the local-frequency optical pulse signal and the reference pulse signal and optimum interference between the local-frequency optical pulse signal and the quantum optical pulse signal.

In addition, it should be noted that, in this embodiment of this application, disposing the dynamic polarization controller 190 in the optical path of the local-frequency optical pulse signal is intended to minimize additional attenuation of the optical pulse signal in the optical path of the optical pulse signal.

Using the receiving apparatus provided in this embodiment of this application can make full use of the reference pulse signal in the optical pulse signal separated after beamsplitting, to obtain real-time polarization information of the reference pulse signal from the reference pulse signal, so that the polarization direction of the local-frequency optical pulse signal can be adjusted in real time. Further, it is ensured that when the local-frequency optical pulse signal interferes with the received optical pulse signal, polarization directions of the two signals are aligned, thereby achieving optimum interference.

The receiving apparatus provided in the embodiments of this application has been described above, and a signal receiving method provided in the embodiments of this application is to be described below with reference to FIG. 7. The receiving method is executed by the receiving apparatus provided in the embodiments of this application.

Figure 7:
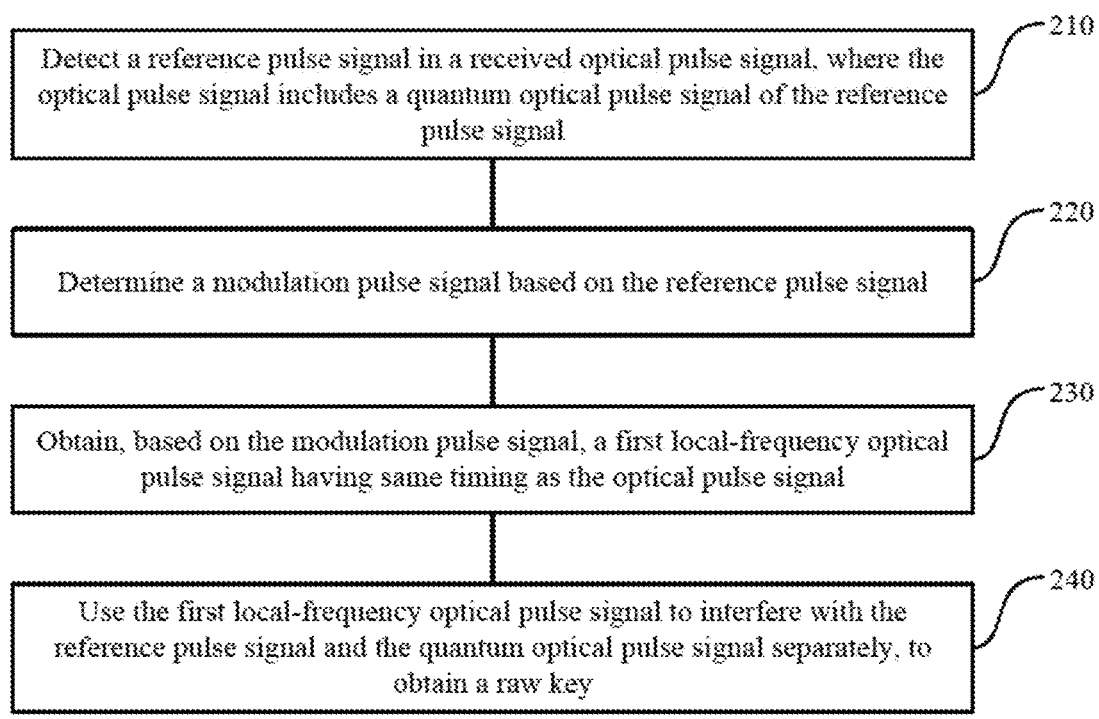
FIG. 7 is a flowchart of a signal receiving method according to an embodiment of this application.

FIG. 7 is a schematic flowchart of a signal receiving method according to an embodiment of this application. As shown in FIG. 7, the receiving method may include the following steps.

S210. Detect a reference pulse signal in a received optical pulse signal, where the optical pulse signal includes a quantum optical pulse signal of the reference pulse signal.

The receiving apparatus receives the optical pulse signal sent by a sending apparatus in an SR-CV-QKD system, where the optical pulse signal includes the reference pulse signal and a quantum optical pulse signal, and an intensity of the reference pulse signal is approximately 1000 times that of the quantum optical pulse signal. The receiving apparatus receives the optical pulse signal and detects the reference pulse signal in the optical pulse signal.

S220. Determine a modulation pulse signal based on the reference pulse signal.

The receiving apparatus generates the modulation pulse signal based on timing information of the detected reference pulse signal, where the timing information of the modulation pulse signal is consistent with timing information of the optical pulse signal. The modulation pulse signal is used to modulate a local-frequency optical pulse signal, that is, the first local-frequency optical pulse signal described in the embodiments of this application, so that the timing information of the modulated first local-frequency optical pulse signal is consistent with the timing information of the optical pulse signal, to be specific, frequency distribution and time-domain distribution of the first local-frequency optical pulse signal are consistent with frequency distribution and time-domain distribution of the optical pulse signal.

S230. Obtain, based on the modulation pulse signal, a first local-frequency optical pulse signal having same timing as the optical pulse signal.

The receiving apparatus obtains, through modulation based on the modulation pulse signal generated based on the timing information of the reference pulse signal, the first local-frequency optical pulse signal whose timing is consistent with that of the optical pulse signal, to efficiently implement timing alignment between the first local-frequency optical pulse signal and the optical pulse signal, so as to achieve optimum interference between the first local-frequency optical pulse signal and the optical pulse signal, and further achieve a more accurate raw key.

S240. Use the first local-frequency optical pulse signal to interfere with the reference pulse signal and the quantum optical pulse signal, to obtain a raw key.

The modulated first local-frequency optical pulse signal whose timing is consistent with that of the optical pulse signal is used to interfere with the reference pulse signal and the quantum optical pulse signal in the optical pulse signal, to obtain the raw key, and a quantum key is obtained after the receiving apparatus performs a series of processing on the obtained raw key.

According to the receiving method provided in this embodiment of this application, the reference pulse signal in the optical pulse signal is detected, the modulation pulse signal is obtained that can make the timing information (frequency distribution and time-domain distribution) of the first local-frequency optical pulse signal consistent with the timing information (frequency distribution and time-domain distribution) of the optical pulse signal, and then modulation is performed to make the timing information of the modulated first local-frequency optical pulse signal consistent with the timing information of the optical pulse signal, so that optimum interference can be achieved between the modulated first local-frequency optical pulse signal and the optical pulse signal, and a more accurate raw key is obtained.

It should be noted that the "first" and "second" described in this embodiment of this application are merely for distinguishing, and do not construe any limitation thereupon.

Figure 8:
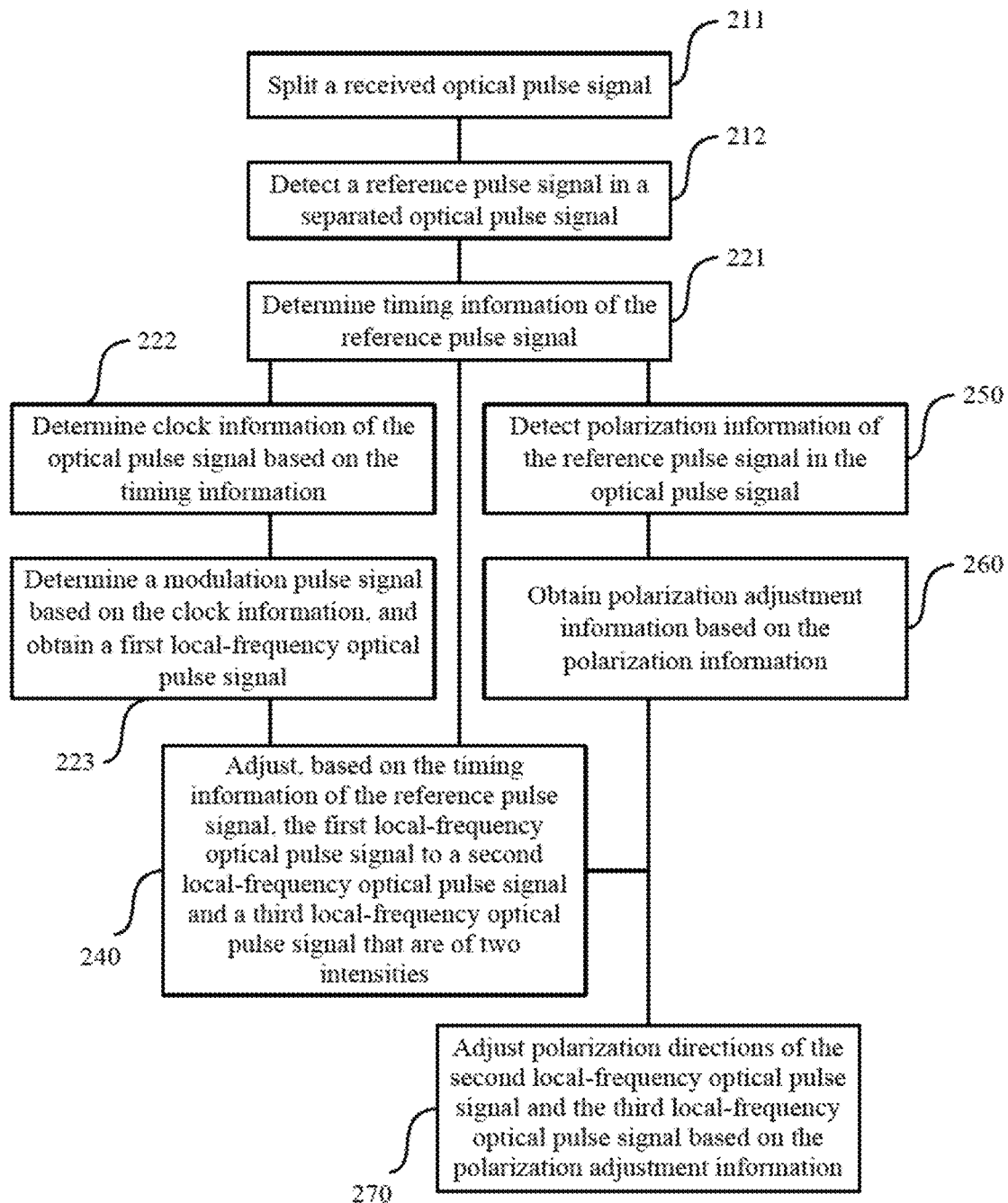
FIG. 8 is a flowchart of another signal receiving method according to an embodiment of this application.

Optionally, in an embodiment of this application, as shown in FIG. 8, detecting the reference pulse signal in the received optical pulse signal includes the following steps.

S211. Split a received optical pulse signal.

S212. Detect a reference pulse signal in a separated optical pulse signal.

In this embodiment of this application, the received optical pulse signal may be split by using a first beamsplitter in the receiving apparatus, and the reference pulse signal in the optical pulse signal is detected by using a first detector connected to an output end of the first beamsplitter. For specific descriptions, refer to specific descriptions of the operations performed by the first beamsplitter and the first detector in FIG. 3. For brevity, details are not described herein again.

It should be noted that the optical pulse signal includes the reference pulse signal and the quantum optical pulse signal.

Optionally, in this embodiment of this application, as shown in FIG. 8, determining the modulation pulse signal based on the reference pulse signal includes the following steps.

S221. Determine timing information of the reference pulse signal.

S222. Determine clock information of the optical pulse signal based on the timing information.

S223. Determine a modulation pulse signal based on the clock information.

In this embodiment of this application, processes of S221, S222, and S223 may be implemented by a synchronization receiving module in the receiving apparatus. The synchronization receiving module may include a clock recovery unit, and an input end of the clock recovery unit is connected to an output end of the first detector. The clock recovery unit recovers the timing information of the reference pulse signal, determines the clock information of the optical pulse signal based on a relationship existing between the reference pulse signal and the quantum optical pulse signal, and generates adjustment clock information based on the clock information of the optical pulse signal, so that the frequency distribution and time-domain distribution of the first local-frequency optical pulse signal are adjusted to be consistent with the frequency distribution and time-domain distribution of the optical pulse signal.

Optionally, in this embodiment of this application, the step of obtaining, based on the modulation pulse signal, a first local-frequency optical pulse signal having same timing as the optical pulse signal is performed by chopping, by a first intensity modulator $IM_1$ in the receiving modulator based on the modulation pulse signal, continuous laser light generated by a laser, to form the first local-frequency optical pulse signal, where timing of the first local-frequency optical pulse signal obtained through chopping is consistent with timing of the optical pulse signal, that is, frequency distribution of the first local-frequency optical pulse signal is consistent with frequency distribution of the optical pulse signal, so that optimum interference is achieved between the first local-frequency optical pulse signal and the optical pulse signal, and a more accurate raw key is obtained. For specific descriptions, refer to descriptions of specific operations performed by the $IM_1$ in FIG. 3, and for brevity, details are not described herein.

Optionally, in another embodiment of this application, as shown in FIG. 8, the receiving method may further include the following steps.

S240. Adjust, based on the timing information of the reference pulse signal, the first local-frequency optical pulse signal.

In this embodiment of this application, the first local-frequency optical pulse signal may be adjusted by using a second intensity modulator $IM_2$ in the receiving apparatus. The $IM_2$ adjusts, based on the timing information of the reference pulse signal, the first local-frequency optical pulse signal into local-frequency optical pulse signals of two intensities: a second local-frequency optical pulse signal and a third local-frequency optical pulse signal. For a specific adjustment process, refer to a process of adjusting, by $IM_2$, the first local-frequency optical pulse signal in FIG. 3, and for brevity, details are not described herein again.

Optionally, in this embodiment of this application, the step of using the first local-frequency optical pulse signal to interfere with the reference pulse signal and the quantum optical pulse signal is performed by using the second local-frequency optical pulse signal to interfere with the quantum optical pulse signal, and using the third local-frequency optical pulse signal to interfere with the reference pulse signal, where an intensity of the second local-frequency optical pulse signal is greater than an intensity of the third local-frequency optical pulse signal.

After the $IM_2$ adjusts the first local-frequency optical pulse signal into the local-frequency optical pulse signals of different intensities, the second local-frequency optical pulse signal and the third local-frequency optical pulse signal, detection may be performed by using one balanced homodyne detector, so that an intensity of the reference pulse signal is 1000 times that of the quantum optical pulse signal, and when detection for the reference pulse signal is not saturated, a dynamic AD/DA range for data collection of the quantum optical pulse is also reasonable.

Optionally, in another embodiment of this application, the receiving method may further include the following steps.

S250. Detect polarization information of the reference pulse signal in the optical pulse signal.

S260. Obtain the polarization adjustment information based on the polarization information.

In this embodiment of this application, S250 and S260 may be implemented by the polarization recognizer and the dynamic polarization controller shown in FIG. 6. For a specific implementation process, refer to the described operation processes of the polarization recognizer and the dynamic polarization controller shown in FIG. 6, and for brevity of description, details are not described herein again.

Before using the second local-frequency optical pulse signal to interfere with the quantum optical pulse signal and using the third local-frequency optical pulse signal to interfere with the reference pulse signal, the method may further include the following step.

S270. Adjust polarization directions of the second local-frequency optical pulse signal and the third local-frequency optical pulse signal based on the polarization adjustment information, so that a polarization direction of the adjusted second local-frequency optical pulse signal is consistent with a polarization direction of the quantum optical pulse signal, and a polarization direction of the third local-frequency optical pulse signal is consistent with a polarization direction of the reference pulse signal, thereby implementing optimum interference, and obtaining an accurate raw key.

A person skilled in the art may further be aware that, the units and algorithm steps in the examples described with reference to the embodiments disclosed in this specification may be implemented by electronic hardware, computer software, or a combination thereof. To clearly describe the interchangeability between hardware and software, the foregoing has generally described compositions and steps of each example based on functions. Whether the functions are performed by hardware or software depends on particular applications and design constraint conditions of the technical solutions. A person skilled in the art may use a different method to implement the described functions for each particular application, but it should not be considered that the implementation goes beyond the scope of this application.

In the foregoing specific implementations, the objective, technical solutions, and benefits of this application are further described in detail. It should be understood that the foregoing descriptions are merely specific implementations of this application, but are not intended to limit the protection scope of this application. Any modification, equivalent replacement, or improvement made without departing from the spirit and principle of this application should fall within the protection scope of this application.

What is claimed is:

1. A signal receiving apparatus, wherein the receiving apparatus comprises:
   a signal receiver configured to detect a reference pulse signal in a received optical pulse signal, wherein the optical pulse signal comprises the reference pulse signal and a quantum optical pulse signal; and
   a synchronization clock receiver configured to obtain a modulation pulse signal based on the reference pulse signal, wherein
   a first intensity modulator in the signal receiver is configured to obtain, based on the modulation pulse signal, a first local-frequency optical pulse signal having same timing as the optical pulse signal, and the signal receiver uses the first local-frequency optical pulse signal to interfere with the reference pulse signal and the quantum optical pulse signal separately, to obtain a raw key.

2. The signal receiving apparatus according to claim 1, wherein the signal receiver comprises a first beamsplitter and a first detector, wherein the first beamsplitter is configured to split the received optical pulse signal; and the first detector is configured to detect the reference pulse signal in a separated optical pulse signal.

3. The signal receiving apparatus according to claim 1, wherein the synchronization clock receiver is configured to obtain the modulation pulse signal based on the reference pulse signal with steps comprising:

determining, by the synchronization clock receiver, clock information of the optical pulse signal based on the reference pulse signal; and obtaining the modulation pulse signal based on the clock information.

4. The signal receiving apparatus according to claim 1, wherein the first intensity modulator is configured to obtain, based on the modulation pulse signal, the first local-frequency optical pulse signal having same timing as the optical pulse signal with steps comprising:

chopping, by the first intensity modulator based on the modulation pulse signal, continuous laser light generated by a laser, to form the first local-frequency optical pulse signal.

5. The signal receiving apparatus according to claim 1, wherein the signal receiver further comprises a signal modulation processor and a second intensity modulator;

the second intensity modulator is connected to the signal modulation processor and the first intensity modulator;

the synchronization clock receiver is further configured to determine timing information of the reference pulse signal;

the signal modulation processor is configured to determine modulation information based on the timing information; and the second intensity modulator is configured to adjust the first local-frequency optical pulse signal based on the modulation information.

6. The signal receiving apparatus according to claim 5, wherein the second intensity modulator is configured to adjust the first local-frequency optical pulse signal based on the modulation information with steps comprising: adjusting, by the first intensity modulator based on the modulation information, the first local-frequency optical pulse signal into local-frequency optical pulses of two intensities: a second local-frequency optical pulse signal and a third local-frequency optical pulse signal.

7. The signal receiving apparatus according to claim 6, wherein the signal receiver uses the first optical pulse signal to interfere with the reference pulse signal and the quantum optical pulse signal separately with steps comprising:

using, by the signal receiver, the second local-frequency optical pulse signal to interfere with the quantum optical pulse signal; and using, by the signal receiver, the third local-frequency optical pulse signal to interfere with the reference pulse signal, wherein an intensity of the second local-frequency optical pulse signal is greater than an intensity of the third local-frequency optical pulse signal.

8. The signal receiving apparatus according to claim 6, wherein the signal receiver further comprises a second beamsplitter and a second detector, and the second beamsplitter is connected to the second intensity modulator, the second detector, and a phase modulator;

the second beamsplitter is configured to separate the second local-frequency optical pulse signal and the third local-frequency optical pulse signal; and the second detector is configured to detect an intensity of the second local-frequency optical pulse signal and an intensity of the third local-frequency optical pulse signal.

9. The signal receiving apparatus according to claim 6, wherein the signal receiver comprises a polarization recognizer; and the polarization recognizer is configured to: receive the optical pulse signal obtained after beamsplitting by a first beamsplitter, detect polarization information of the reference signal in the optical pulse signal, and generate polarization adjustment information based on the polarization information.

10. The signal receiving apparatus according to claim 9, wherein the signal receiver further comprises a third beamsplitter, and the first beamsplitter is connected to the polarization recognizer by using the third beamsplitter;

the third beamsplitter is configured to receive the optical pulse signal separated by the first beamsplitter, and perform beamsplitting on the optical pulse signal; and the polarization recognizer determines polarization information of a reference pulse signal in an optical pulse signal separated by the third beamsplitter.

11. The signal receiving apparatus according to claim 9, wherein the signal receiver further comprises a dynamic polarization controller, and the dynamic polarization controller is connected to the polarization recognizer, the second intensity modulator, and the second beamsplitter; and the dynamic polarization controller is configured to adjust polarization directions of the second local-frequency optical pulse signal and the third local-frequency optical pulse signal based on the polarization adjustment information, and output the second local-frequency optical pulse signal and the third local-frequency optical pulse signal whose polarization directions are adjusted, to the second beamsplitter.

12. A signal receiving method, wherein the receiving method comprises:

detecting a reference pulse signal in a received optical pulse signal, wherein the optical pulse signal comprises the reference pulse signal and a quantum optical pulse signal;

determining a modulation pulse signal based on the reference pulse signal;

obtaining, based on the modulation pulse signal, a first local-frequency optical pulse signal having same timing as the optical pulse signal;

using the first local-frequency optical pulse signal to interfere with the reference pulse signal and the quantum optical pulse signal, to obtain a raw key.

13. The signal receiving method according to claim 12, wherein the detecting the reference pulse signal in the received optical pulse signal comprises:

splitting the received optical pulse signal; and detecting the reference pulse signal in a separated optical pulse signal.

14. The signal receiving method according to claim 12, wherein the determining the modulation pulse signal based on the reference pulse signal comprises:

determining timing information of the reference pulse signal;

determining clock information of the optical pulse signal based on the timing information; and determining the modulation pulse signal based on the clock information.

15. The signal receiving method according to claim 12, wherein the obtaining, based on the modulation pulse signal, the first local-frequency optical pulse signal having same timing as the optical pulse signal comprises:

chopping, based on the modulation pulse signal, continuous laser light generated by a laser, to form the first local-frequency optical pulse signal.

16. The signal receiving method according to claim 14, wherein the signal receiving method further comprises:

adjusting, based on the timing information, the first local-frequency optical pulse signal.

17. The signal receiving method according to claim 16, wherein the adjusting, based on the timing information, the first local-frequency optical pulse signal comprises:

adjusting, based on the timing information, the first local-frequency optical pulse signal into local-frequency optical pulse signals of two intensities: a second local-frequency optical pulse signal and a third local-frequency optical pulse signal.

18. The signal receiving method according to claim 17, wherein the using the first local-frequency optical pulse signal to interfere with the reference pulse signal and the quantum optical pulse signal comprises:

using the second local-frequency optical pulse signal to interfere with the quantum optical pulse signal; and using the third local-frequency optical pulse signal to interfere with the reference pulse signal; wherein an intensity of the second local-frequency optical pulse signal is greater than an intensity of the third local-frequency optical pulse signal.

19. The signal receiving method according to claim 12, wherein the method further comprises:

detecting polarization information of the reference pulse signal in the optical pulse signal; and obtaining polarization adjustment information based on the polarization information.

20. The signal receiving method according to claim 19, wherein before using the second local-frequency optical pulse signal to interfere with the quantum optical pulse signal and using the third local-frequency optical pulse signal to interfere with the reference pulse signal, the method further comprises:

adjusting polarization directions of the second local-frequency optical pulse signal and the third local-frequency optical pulse signal based on the polarization adjustment information.

* * * * *